US008740454B2

(12) United States Patent
Takei et al.

(10) Patent No.: US 8,740,454 B2
(45) Date of Patent: Jun. 3, 2014

(54) ENVIRONMENTAL MEASUREMENT SYSTEM AND ENVIRONMENTAL MEASUREMENT METHOD

(75) Inventors: Fumio Takei, Kawasaki (JP); Kazushi Uno, Kawasaki (JP); Takeo Kasajima, Kawasaki (JP)

(73) Assignee: Fujitus Limited, Kawasaki (JP)

(*) Notice: Subject to any disclaimer, the term of this patent is extended or adjusted under 35 U.S.C. 154(b) by 8 days.

(21) Appl. No.: 13/564,131

(22) Filed: Aug. 1, 2012

(65) Prior Publication Data
US 2012/0307861 A1 Dec. 6, 2012

Related U.S. Application Data

(63) Continuation of application No. PCT/JP2010/052817, filed on Feb. 24, 2010.

(51) Int. Cl.
*G01K 3/00* (2006.01)
*G01J 5/00* (2006.01)
*G01K 1/00* (2006.01)
*G01K 11/00* (2006.01)

(52) U.S. Cl.
USPC ........... 374/102; 374/131; 374/120; 374/137; 374/124; 374/161; 374/109

(58) Field of Classification Search
USPC .......... 374/131, 120, 102, 124, 137, 161, 109
See application file for complete search history.

(56) References Cited

U.S. PATENT DOCUMENTS

| | | | | |
|---|---|---|---|---|
| 5,004,913 A | * | 4/1991 | Kleinerman | 250/227.21 |
| 6,856,396 B2 | * | 2/2005 | McGuire | 356/450 |
| 7,430,903 B2 | * | 10/2008 | Ramos | 73/204.11 |
| 8,287,184 B2 | * | 10/2012 | Sasaoka | 374/137 |
| 2006/0214098 A1 | * | 9/2006 | Ramos | 250/256 |
| 2007/0171396 A1 | * | 7/2007 | Harris et al. | 356/28 |

(Continued)

FOREIGN PATENT DOCUMENTS

| | | |
|---|---|---|
| JP | H5-107121 | 4/1993 |
| JP | H6-174561 | 6/1994 |
| JP | 3048784 | 5/1998 |

(Continued)

OTHER PUBLICATIONS

International Search Report for International Application No. PCT/JP2010/052817 dated Apr. 6, 2010.

*Primary Examiner* — Mirellys Jagan
(74) *Attorney, Agent, or Firm* — Kratz, Quintos & Hanson, LLP

(57) ABSTRACT

An optical fiber is provided with a first measurement portion and a second measurement portion provided with covering layers different at least in any one of heat capacity and heat conductivity. Then, the first measurement portion and the second measurement portion are located in the same measurement position and light is inputted from a temperature measurement device into the optical fiber. Thereafter, the temperature measurement device receives backscattered light generated inside the optical fiber to measure temperature distribution in a longitudinal direction of the optical fiber. An analyzer analyzes a variation over time of the temperature distribution outputted from the temperature measurement device to calculate a temperature and a wind velocity in a measurement position where the first measurement portion and the second measurement portion are located.

13 Claims, 10 Drawing Sheets

(56) References Cited

U.S. PATENT DOCUMENTS

| | | |
|---|---|---|
| 2009/0051896 A1* | 2/2009 | Caldwell et al. ............... 356/28 |
| 2010/0027581 A1 | 2/2010 | Sasaoka |
| 2012/0161446 A1* | 6/2012 | McNeill et al. ................ 290/55 |
| 2012/0229792 A1* | 9/2012 | Fuglsang et al. .............. 356/28 |
| 2012/0310535 A1* | 12/2012 | Takei et al. ..................... 702/3 |
| 2013/0166113 A1* | 6/2013 | Dakin et al. ..................... 701/10 |

FOREIGN PATENT DOCUMENTS

| | | |
|---|---|---|
| JP | 2001-194381 A1 | 7/2001 |
| JP | 2009-265083 A1 | 11/2009 |
| WO | WO 2008/081720 A1 | 7/2008 |

* cited by examiner

US 8,740,454 B2

ENVIRONMENTAL MEASUREMENT SYSTEM AND ENVIRONMENTAL MEASUREMENT METHOD

CROSS-REFERENCE TO RELATED APPLICATION

This application is a continuation of International Application No. PCT/JP2010/052817 filed Feb. 24, 2010 and designated the U.S., the entire contents of which are incorporated herein by reference.

FIELD

The embodiments discussed herein are related to an environmental measurement system and an environmental measurement method of measuring temperatures and wind velocities in a factory, an office building, a data center, and the like.

BACKGROUND

Prevention of global warming has been an urgent issue in recent years, and all the aspects of society are requested to achieve power saving due to this reason. For example, an enormous amount of electric power is consumed for air conditioning in a factory, a large office building, an Internet data center or the like (hereinafter referred to as a "facility such as an office building") and there are demands for both of power saving in such air-conditioning equipment and optimization of air conditioning.

In order to optimize air conditioning in a facility such as an office building, it is preferable to measure temperatures and wind velocities in many positions in the facility and to control air-conditioning equipment based on measurement results. When there are few measurement positions, temperature sensors and wind velocity sensors may be individually installed in the respective positions. The temperature sensor usable for this purpose may be a thermocouple, a platinum resistance temperature detector, a thermistor, an expansion thermometer, and the like. Meanwhile, the wind velocity sensor usable may be a hot-wire wind velocity sensor, a vane (windmill) type wind velocity sensor, an ultrasonic wind velocity sensor, and the like.

However, when the aforementioned sensors are used in many measurement positions, a large number of sensors are used, which leads to an increase in cost of the entire system. In the meantime, an increase in the number of sensors leads to an increase in cost required for maintenance. In this regard, there is a proposal to measure a temperature in a facility such as an office building by use of a temperature measurement device employing an optical fiber as a temperature sensor (such a device will be hereinafter referred to as an "optical fiber temperature measurement device").

The optical fiber temperature measurement device is configured to measure a temperature by inputting a laser beam into an optical fiber and detecting Raman backscattered light generated inside the optical fiber. The device may measure temperature distribution in a longitudinal direction of the optical fiber within a short time. Meanwhile, there is also a proposal of a flow velocity measurement device which employs an optical fiber as a flow velocity sensor. This flow velocity measurement device is configured to heat an optical fiber with a heating element and to calculate a flow velocity of a fluid based on a change in temperature. A wind velocity in a facility such as an office building may be measured by use of the flow velocity measurement device of this type.

Patent Document 1: Japanese Laid-open Patent Publication No. 05-107121
Patent Document 2: Japanese Laid-open Patent Publication No. 06-174561

SUMMARY

According to an aspect, an environmental measurement system includes an optical fiber including a first measurement portion and a second measurement portion provided with covering layers different at least in any one of heat capacity and heat conductivity; a temperature measurement device configured to input light into the optical fiber, and to receive backscattered light outputted from the optical fiber to measure temperature distribution in a longitudinal direction of the optical fiber; and an analyzer configured to analyze a variation over time of the temperature distribution outputted from the temperature measurement device to calculate a temperature and a wind velocity in a measurement position where the first measurement portion and the second measurement portion are located.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described below with reference to the accompanying drawings.

(First Embodiment)

Figure 1:
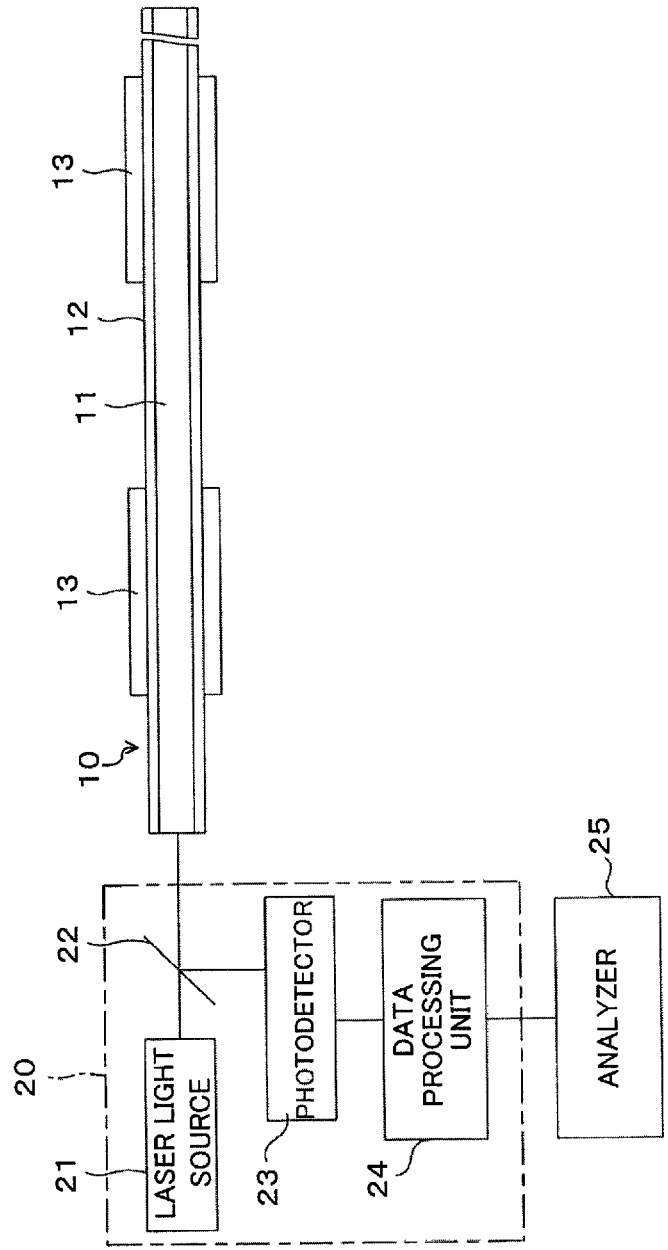
FIG. 1 is a block diagram illustrating an outline of an environment measurement system according to a first embodiment.
Figure 2A:
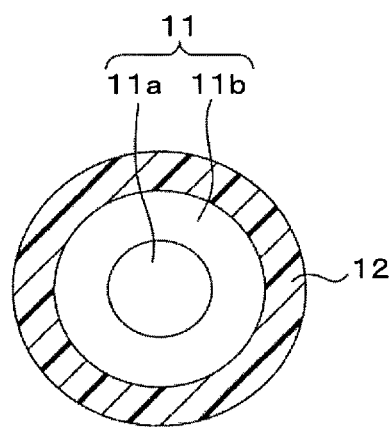
FIGS. 2A and 2B are cross-sectional views of portions of an optical fiber.
Figure 2B:
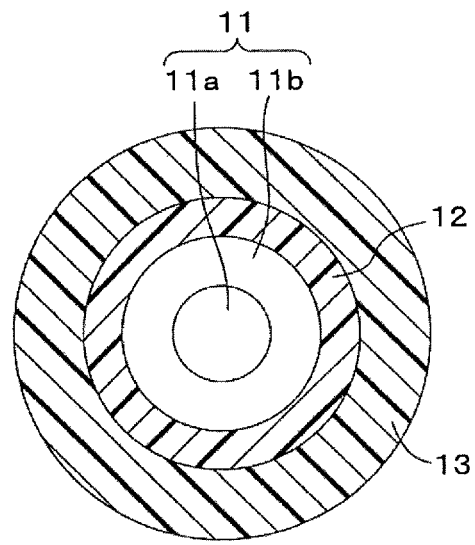

FIG. 1 is a block diagram illustrating an outline of an environment measurement system according to a first embodiment, and FIGS. 2A and 2B are cross-sectional views of portions of an optical fiber.

As illustrated in FIG. 1, an environmental measurement system of this embodiment includes an optical fiber 10, a temperature measurement device 20, and an analyzer (a computer) 25.

The optical fiber 10 includes a core wire 11 configured to propagate a laser beam, a first covering layer 12 configured to cover the core wire 11, and second covering layers 13 located in predetermined positions in a longitudinal direction of the optical fiber 10 and configured to cover the first covering layer 12. FIG. 2A depicts a cross-section of a portion where the first covering layer 12 is exposed, and FIG. 2B depicts a cross-section of a portion where the second covering layer 13 is located. As depicted in FIGS. 2A and 2B, the core wire 11 includes a core 11a and a clad 11b arranged around the core 11a. Light is enclosed in and transmitted on the core 11a by means of a difference in the refractive index between the core 11a and the clad 11b.

The first covering layer 12 is made of polymer resin such as polyurethane and covers the entire core wire 11 with a uniform thickness. The second covering layer 13 may be made of the same material as the material of the first covering layer 12 or a different material from the material of the first covering layer 12. In short, the optical fiber 10 may be provided with a portion having the thick covering layer and a portion having the thin covering layer along the longitudinal direction. In this embodiment, the second covering layer 13 is assumed to be made of silicone resin.

The heat capacity and heat conductivity of a covering layer change depending on the thickness and the material of the covering layer. Accordingly, the optical fiber 10 used in this embodiment includes two types of portions different in heat capacity and heat conductivity.

As described later, in this embodiment, the portion provided only with the first covering layer 12 and the portion where the second covering layer 13 is located are located in the same measurement position so as to measure a temperature and a wind velocity in the measurement position. When there is just one measurement position, the second covering layer 13 may be located in one position in the longitudinal direction of the optical fiber 10. If there are two or more measurement positions, then a plurality of the second covering layers 13 are located along the longitudinal direction of the optical fiber 10.

The temperature measurement device 20 includes a laser light source 21, a beam splitter 22, a photodetector 23, and a data processing unit 24. The optical fiber 10 (the core wire 11) is optically connected to the laser light source 21 and the beam splitter 22.

A laser beam (a laser pulse) is emitted from the laser light source 21 at a given time interval. The laser beam emitted from the laser light source 21 passes through the beam splitter 22 and enters the optical fiber 10 (the core wire 11), and then propagates inside the optical fiber 10 in the longitudinal direction thereof. A portion of the light propagating inside the optical fiber 10 is backscattered by molecules which constitute the optical fiber 10 (the core wire 11). The backscattered light goes back in the optical fiber 10 and is emitted from an end on the light source side. Then, the backscattered light is reflected by the beam splitter 22 and is inputted to the photodetector 23.

Figure 3:
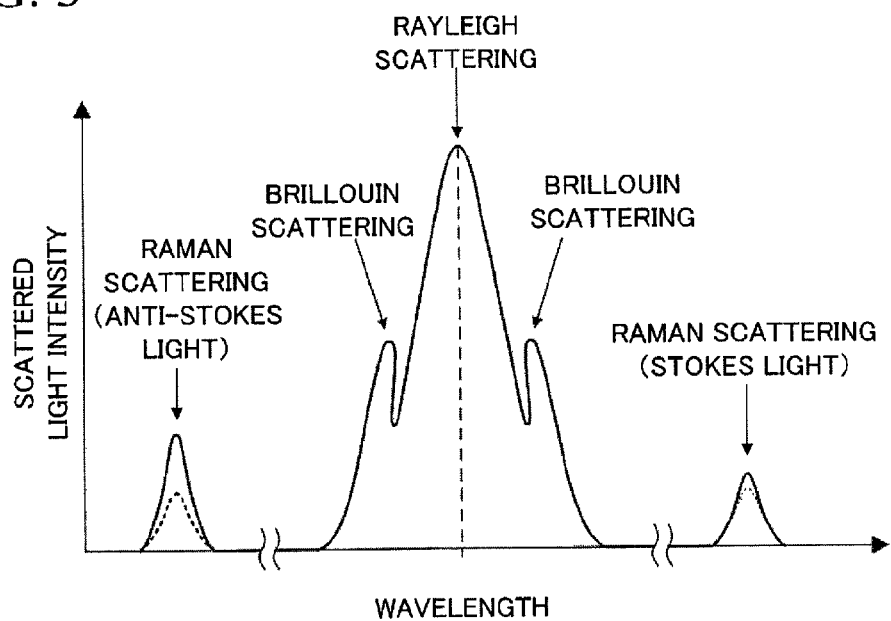
FIG. 3 is a view illustrating a spectrum of backscattered light.

As illustrated in FIG. 3, the backscattered light generated inside the optical fiber 10 includes Rayleigh scattered light, Brillouin scattered light, and Raman scattered light. The Rayleigh scattered light is the light having the same wavelength as the incident light. Meanwhile, each of the Brillouin scattered light and the Raman scattered light is the light having a wavelength shifted from the wavelength of the incident light.

The Raman scattered light includes Stokes light shifted to a longer wavelength than the incident light and anti-Stokes light shifted to a shorter wavelength than the incident light. Although a shift amount of the each of the Stokes light and the anti-Stokes light depends on the wavelength of the laser beam, the materials constituting the optical fiber 10 (the core wire 11), and the like, the shift amount is usually around 50 nm. In the meantime, an intensity of each of the Stokes light and the anti-Stokes light varies with the temperature. Here, the Stokes light has a smaller amount of variation with the temperature, whereas the anti-Stokes light has a larger amount of variation with the temperature. In other words, the Stokes light has smaller temperature dependence and the anti-Stokes light has larger temperature dependence. The photodetector 23 separates the Stokes light and the anti-Stokes light from the backscattered light and detects an amount of each of the separated light factors.

Figure 4:
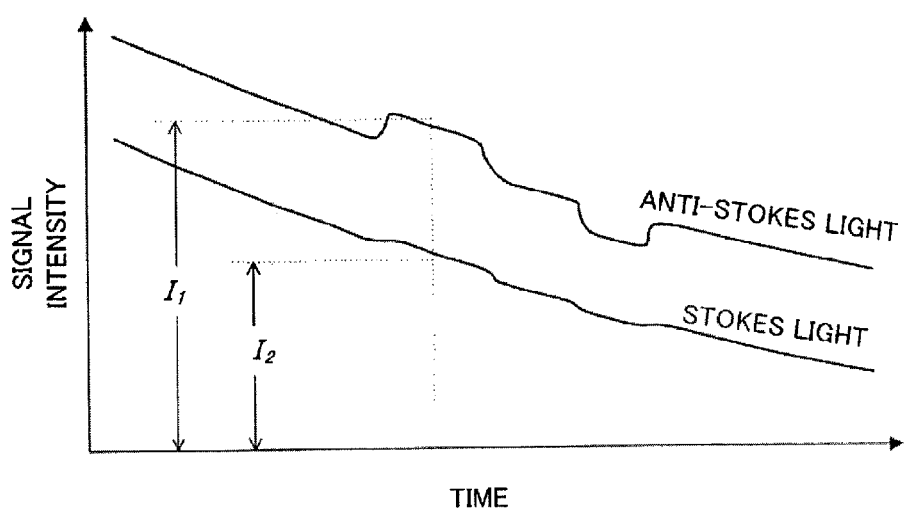
FIG. 4 is a view illustrating an example of variations over time of Raman scattered light intensities.

FIG. 4 is a view illustrating an example of variations over time of Raman scattered light intensities, in which the horizontal axis indicates time and the vertical axis indicates signal intensities detected by the photodetector 23. The photodetector 23 detects the Stokes light and the anti-Stokes light for a predetermined period from immediately after incidence of the laser pulse on the optical fiber 10. If the temperature is uniform across the entire length of the optical fiber 10, a signal intensity is reduced over time based on a point of incidence of the laser pulse on the optical fiber 10. In this case, the time on the horizontal axis indicates a distance from an end on the light source side of the optical fiber 10 to a position of generation of the backscattered light while the reduction in the signal intensity over time represents attenuation of the light caused by the optical fiber 10.

If the temperature is not uniform across the longitudinal direction of the optical fiber 10, namely, when there are a high-temperature portion and a low-temperature portion along the longitudinal direction, for example, the signal intensities of the Stokes light and the anti-Stokes light do not attenuate uniformly. Instead, peaks and valleys emerge in the curves indicating the variations over time of the signal intensities as illustrated in FIG. 4. In FIG. 4, an intensity of the anti-Stokes light at a given time point t is defined as $I_1$ while an intensity of the Stokes light at the time point t is defined as $I_2$.

Figure 5:
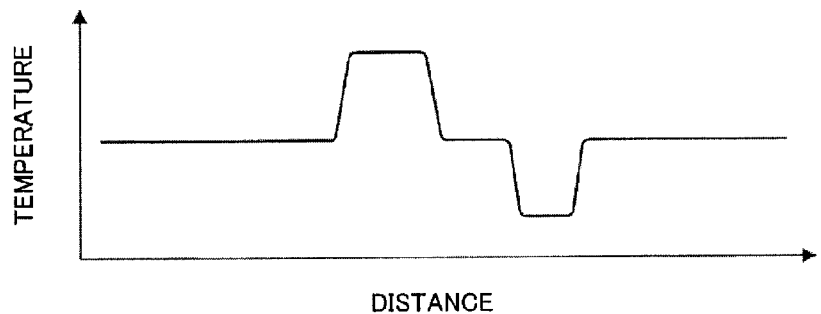
FIG. 5 is a view illustrating a result obtained by calculating a ratio $I_1/I_2$ at various time points based on the variations over time of the Raman scattered light intensities illustrated in FIG. 4, converting the scale of the horizontal axis (time) in FIG. 4 into the distance, and converting the scale of the vertical axis (signal intensity) in FIG. 4 into the temperature.

FIG. 5 is a view illustrating a result obtained by calculating a ratio $I_1/I_2$ at various time points based on the variations over time of the Raman scattered light intensities illustrated in FIG. 4, converting the scale of the horizontal axis (time) in FIG. 4 into the distance, and converting the scale of the vertical axis (signal intensity) in FIG. 4 into the temperature. As illustrated in FIG. 5, temperature distribution in the longitudinal direction of the optical fiber 10 may be measured by calculating the intensity ratio ($I_1/I_2$) of the anti-Stokes light to the Stokes light.

Calculation of the intensity ratio of the anti-Stokes light to the Stokes light is executed by the data processing unit 24. Data on the temperature distribution in the longitudinal direction of the optical fiber 10 are outputted from the data processing unit 24 at given time intervals. The analyzer 25 analyzes the variations over time of the temperature distribution outputted from the data processing unit 24 and calculates temperatures and wind velocities (fluid velocities).

Figure 6:
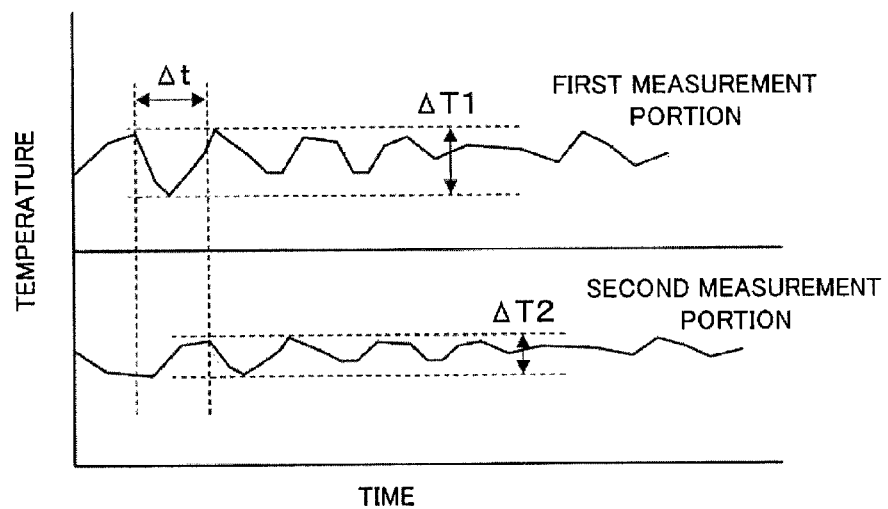
FIG. 6 is a view illustrating variations in temperatures measured with a temperature measurement device when an optical fiber is exposed to a wind having a constant wind velocity.

FIG. 6 is a view illustrating an example of variations in temperatures measured with the temperature measurement device 20 when the optical fiber 10 is exposed to a wind having a constant wind velocity. Here, a portion of the optical fiber 10 provided only with the first covering layer 12 (such a portion will be hereinafter referred to as a "first measurement portion") and a portion thereof where the second covering layer 13 is located (such a portion will be hereinafter referred to as a "second measurement portion") are assumed to be located in the same position in a coiled state. Moreover, a flow of air (a wind) is assumed to be generated by an air conditioner in a room. In general, even when a temperature setting of the air conditioner is set constant, the temperature of the wind generated by the air conditioner does not become constant but has a temperature fluctuation within a range of about ±0.5° C.

As illustrated in FIG. 6, each of the first measurement portion and the second measurement portion is affected by the temperature fluctuation of the wind and the temperatures measured with the temperature measurement device 20 therefore exhibit the variations over time. In this case, the temperature variation at the second measurement portion has a smaller variation range than that of the temperature variation at the first measurement portion, and a delay equivalent to time Δt also occurs. This delay is determined by heat conductivity and heat capacity of the second covering layer 13. Thus, the second covering layer 13 is deemed to have a function as a low-pass filter with characteristics which are determined by the heat conductivity and the heat capacity thereof.

Although the widths of the delay and the temperature variation may be different, the temperature fluctuation at the second measurement portion measured with the temperature measurement device 20 indicates basically the same behavior as the temperature fluctuation at the first measurement portion. Here, a higher wind velocity accelerates averaging of the temperatures in the course of temperature transmission and therefore reduces a proportion of a temperature fluctuation range ΔT2 at the second measurement portion relative to a temperature fluctuation range ΔT1 at the first measurement portion. As a consequence, the wind velocity may be derived from a ratio (ΔT2/ΔT1) of the temperature fluctuation range ΔT2 at the second measurement portion to the temperature fluctuation range ΔT1 at the first measurement portion.

However, as described previously, there is a delay (a phase difference) between the temperature fluctuation at the first measurement portion and the temperature fluctuation at the second measurement portion. It is therefore preferable to calculate the value ΔT2/ΔT1 after obtaining the delay time and setting the phase difference equal to 0.

Figure 7:
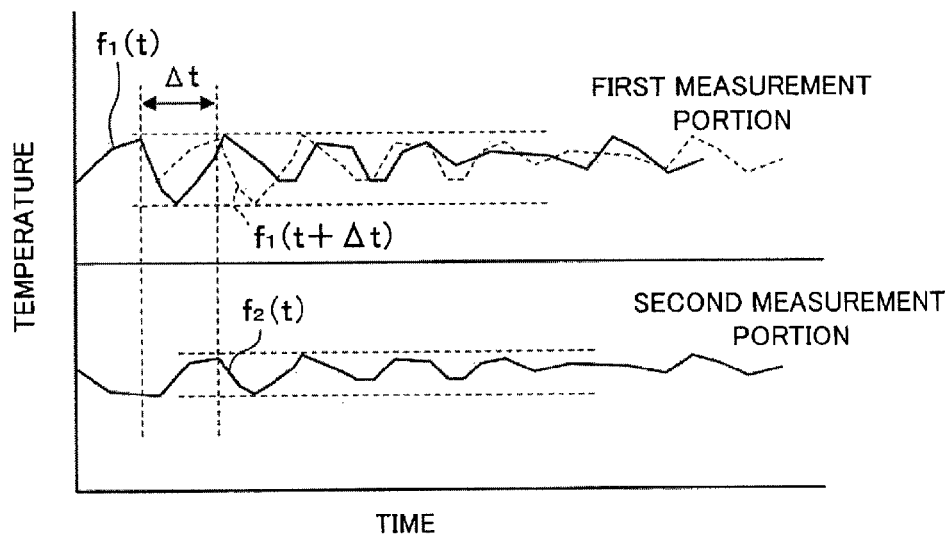
FIG. 7 is a view illustrating an example of a method of calculating delay time $\Delta t$ between a temperature fluctuation at a first measurement portion and a temperature fluctuation at a second measurement portion.

FIG. 7 is a view illustrating an example of a method of calculating the delay time Δt between the temperature fluctuation at the first measurement portion and the temperature fluctuation at the second measurement portion. As illustrated in FIG. 7, the temperature fluctuation at the first measurement portion is defined as a function $f_1(t)$ of the time t and the temperature fluctuation at the second measurement portion is defined as a function $f_2(t)$ of the time t. Moreover, values $f_1(t+\Delta t)-f_2(t)$ are calculated while gradually changing the parameter Δt from 0 to greater values until the parameter which derives the smallest value $f_1(t+\Delta t)-f_2(t)$ is found and determined as the delay time Δt. Once the delay time Δt is determined, the phase difference between the temperature fluctuation at the first measurement portion and the temperature fluctuation at the second measurement portion may be set equal to 0.

Figure 8:
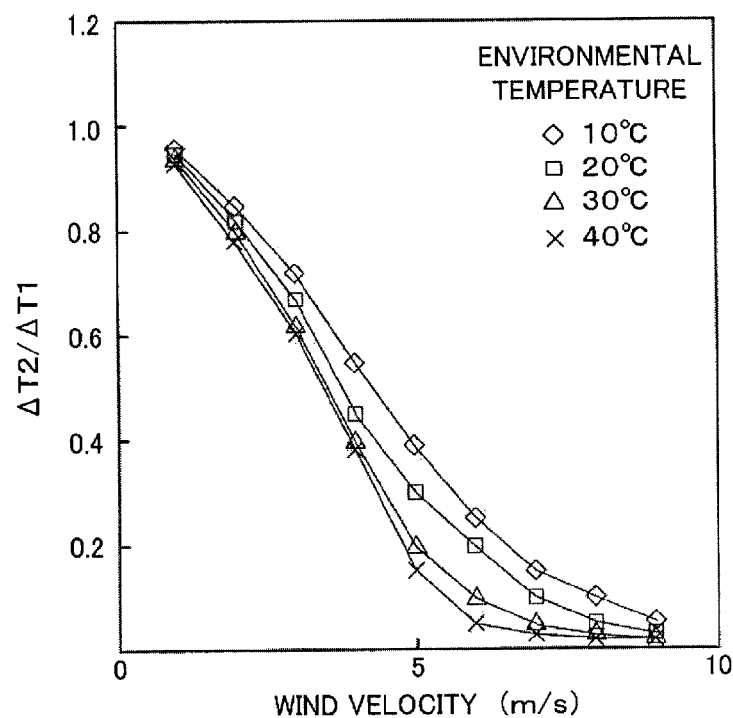
FIG. 8 is a view illustrating relations between wind velocities and values $\Delta T2/\Delta T1$ at various environmental temperatures.

FIG. 8 is a view illustrating relations between the wind velocities and the values ΔT2/ΔT1 at various environmental temperatures, in which the horizontal axis indicates the wind velocity and the vertical axis indicates the value ΔT2/ΔT1. It is to be noted, however, that the wind velocities serving as references are measured by use of a vane type anemometer. As illustrated in FIG. 8, the relation between the value ΔT2/ΔT1 and the wind velocity varies depending on the environmental temperature. Accordingly, it is preferable to find the relations between the wind velocities and the values ΔT2/ΔT1 at a plurality of environmental temperatures in advance when the environmental temperature varies. Here, conversion tables derived from FIG. 8, or namely, tables indicating the relations between the values ΔT2/ΔT1 and the wind velocities at various environmental temperatures, are stored in the analyzer 25. Alternatively, it may be also possible to obtain relational expressions (calculation formulae) indicating the relations between the values ΔT2/ΔT1 and the wind velocities at various environmental temperatures and to store the relational expressions in the analyzer 25.

Figure 9:
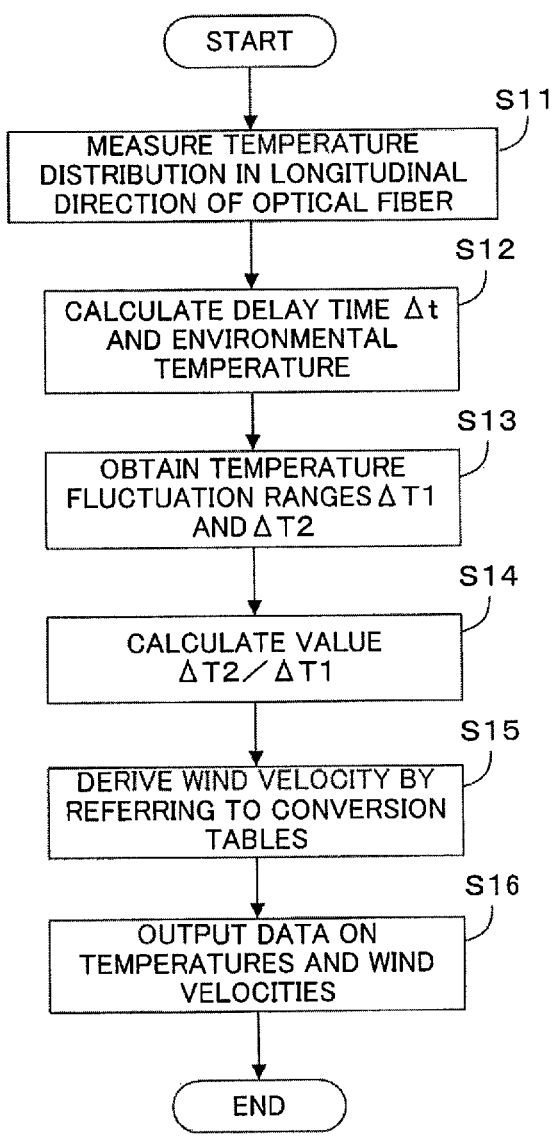
FIG. 9 is a flowchart illustrating an environmental measurement method according to the first embodiment.

FIG. 9 is a flowchart illustrating an environmental measurement method according to this embodiment.

First, in step S11, the temperature measurement device 20 measures the temperature distribution in the longitudinal direction of the optical fiber 10. Specifically, the laser beam (the laser pulse) is emitted from the laser light source 21 at a given time interval. Then, the photodetector 23 extracts the Stoke light and the anti-Stokes light from the backscattered light generated inside the optical fiber 10, and outputs detection values of amounts of these light factors to the data processing unit 24. The data processing unit 24 derives the temperature distribution in the longitudinal direction of the optical fiber 10 from the detection values of the amounts of the Stoke light and the anti-Stoke light, and outputs a derived result to the analyzer 25 as needed.

Next, in step S12, the analyzer 25 extracts the variation over time of the temperature at the first measurement portion and the variation over time of the temperature at the second measurement portion from the temperature distribution outputted from the data processing unit 24. Then, the analyzer 25 obtains the delay time Δt by subjecting the variations over time of the temperatures to a phase analysis, and sets the phase difference between the variation over time of the temperature at the first measurement portion and the variation over time of the temperature at the second measurement portion equal to 0. Meanwhile, the analyzer 25 determines the environmental temperature by calculating an average value of the variations over time of the temperature at the first measurement portion. Instead, the analyzer 25 may determine the environmental temperature by calculating an average value of the variations over time of the temperature at the second measurement portion, or by calculating the average values of the variations over time of the temperatures at both of the first measurement portion and the second measurement portion.

Next, in step S13, the analyzer 25 obtains the temperature fluctuation range ΔT1 at the first measurement portion and the temperature fluctuation range ΔT2 at the second measurement portion. Then, the analyzer 25 calculates the value ΔT2/ΔT1 in step S14.

Next, in step S15, the analyzer 25 derives the wind velocity from the value ΔT2/ΔT1 by referring to the conversion tables. Here, the environmental temperature is assumed to be equal to 24° C., for example, and the analyzer 25 is assumed to store only a conversion table for the temperature at 20° C. and a conversion table for the temperature at 30° C. In this case, the analyzer 25 calculates the wind velocity at the temperature of 24° C. by performing interpolation using the wind velocity found from the conversion table for the temperature at 20° C. and the wind velocity found from the conversion table for the temperature at 30° C. Nonetheless, when the wind velocity does not have to be precise, it may be possible to apply the wind velocity found from the conversion table for the nearest temperature to the environmental temperature (which is the conversion table for the temperature at 20° C. in this case) and to omit the interpolation. In this way, the temperature (the environmental temperature) and the wind velocity in each measurement position are determined.

Subsequently, in step S16, the analyzer 25 outputs the measurement results of the temperatures and the wind velocities in the respective measurement positions to a controller (not illustrated) configured to control the air-conditioning equipment. The controller controls the air-conditioning equipment (air conditioners as well as fans and the like which are installed in locations in the facility such as an office building) based on the measurement results of the temperatures and the wind velocities outputted from the analyzer 25 and thereby optimizes air conditioning.

In this embodiment, the single optical fiber 10 may measure the temperatures and the wind velocities (fluid velocities) in a plurality (100 or more, for example) of measurement positions at the same time. Accordingly, this embodiment involves a simpler system configuration as compared to a system constructed by individually installing a temperature sensor and a wind velocity sensor in each of measurement positions, thereby reducing costs for constructing the system and costs for maintenance. Moreover, this embodiment neither uses a heating element for measuring the wind velocities nor uses electric power to be supplied to the heating element. Accordingly, the system as a whole consumes less electric power. Due to the aforementioned reasons, the environmental measurement system according to this embodiment is suitable for measurement of the temperatures and the wind velocities in many measurement positions in a facility such as a data center, a large office building or a factory.

Although this embodiment is configured to measure the temperature distribution by using the Raman scattered light (the Stokes light and the anti-Stokes light), it may be also possible to measure the temperature distribution by using the Brillouin scattered light.

Results of actual measurement of the temperatures and the wind velocities in accordance with the environmental measurement method of this embodiment will be described below.

A multimode graded-index quartz optical fiber (HFR-2Z-1: manufactured by Furukawa Electric Co., Ltd.) is used for the optical fiber serving as the sensor. This optical fiber is formed by covering the core wire 11 with polyurethane resin. This polyurethane resin layer is defined as the first covering layer 12. The diameter of the optical fiber (the outside diameter of the first covering layer 12) is set to 250 μm and the diameter of the core wire 11 is set to 125 μm.

The second covering layers 13 are formed by coating an ultraviolet-setting silicone varnish (X-31-2011-1: manufactured by Shin-Etsu Chemical Co., Ltd.) around this optical fiber. Each second covering layer 13 has a length of 1 m and the layers 13 are provided at a pitch of 2 m along the longitudinal direction of the optical fiber. The second covering layers 13 have a thickness of 0.3 mm. Here, the silicone varnish is coated on the optical fiber and is then set by irradiating the silicon varnish with light (ultraviolet rays) from a high-pressure mercury lamp (160 M/cm) while pulling the optical fiber at a rate of 1 m/min.

The optical fiber provided with the first covering layer 12 and the second covering layers 13 is installed in a wind tunnel which allows ventilation of a wind having a constant temperature and a constant velocity. Then, a terminal end of the optical fiber is connected to a Raman scattered light measurement device (DTS800M: manufactured by SENSA) serving as the temperature measurement device 20.

In addition, a hot-wire anemometer is also disposed in the wind tunnel. Then, the wind velocities are measured with the hot-wire anemometer and in accordance with the environmental measurement method of this embodiment while changing setting values of the wind velocity in the wind tunnel from 1 m/s to 10 m/s. According to the environmental measurement method of this embodiment, the Raman scattered light measurement device samples and records the temperatures of the portion provided only with the first covering layer 12 and of the portion where the second covering layer 13 is located once in every 10 seconds. Then, the temperature of the wind (the environmental temperature) is calculated by using a portion of thus obtained data concerning the portion provided only with the first covering layer 12. Meanwhile, the ratio (ΔT2/ΔT1) of the temperature fluctuation ranges between the portion provided only with the first measurement portion 12 and the portion where the second covering layer 13 is located is calculated and the calculated value is converted into the wind velocity by using FIG. 8.

Figure 10:
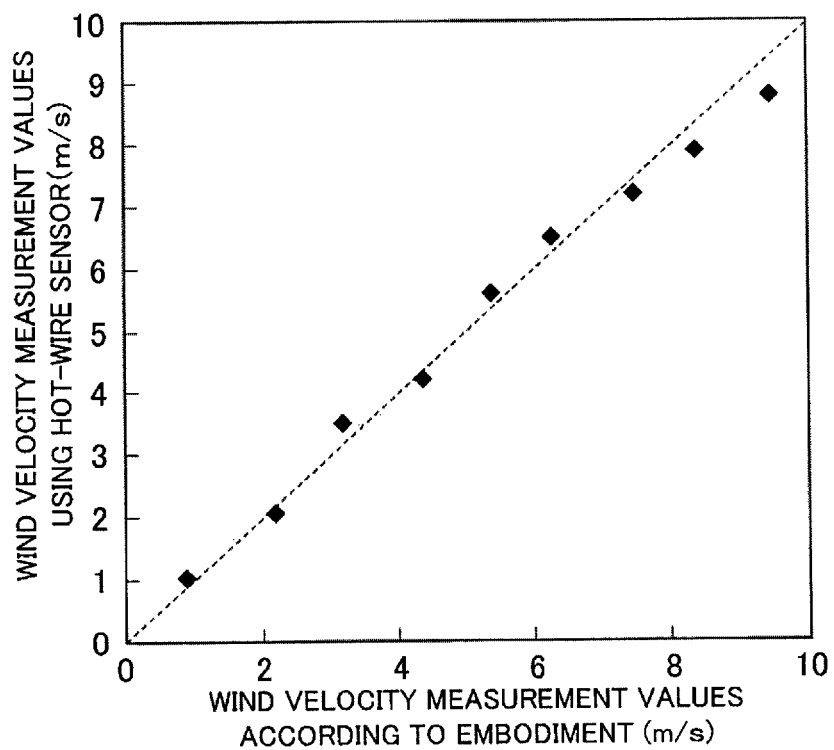
FIG. 10 is a view illustrating a correlation between wind velocity measurement values according to the environmental measurement method of the first embodiment and wind velocity measurement values using a hot-wire anemometer.

FIG. 10 is a view illustrating a correlation between wind velocity measurement values according to the environmental measurement method of this embodiment and wind velocity measurement values using the hot-wire anemometer. As illustrated in FIG. 10, it is confirmed that the wind velocities measured in accordance with the environmental measurement method of this embodiment closely agree with the wind velocities measured by using the hot-wire anemometer with errors not exceeding 10%.

In the environmental measurement method of this embodiment, the temperature measurement device 20 and the analyzer (the computer) 25 are the constituents which consume electric power. The power consumption in the case of performing the environmental measurement by using the optical fiber having the entire length of 2 km is approximately equal to or below 200 W.

Although the second covering layer 13 is made of resin (a polymer material) in this embodiment, the second covering layer 13 may also be made of a metallic material, an inorganic material or the like. Alternatively, the second covering layer 13 may be made of a composite material of the above-mentioned materials. The characteristics of the optical fiber as the sensor may be adjusted by changing the heat capacity and the heat conductivity depending on the materials of the covering layer.

(Second Embodiment)

Figure 11:
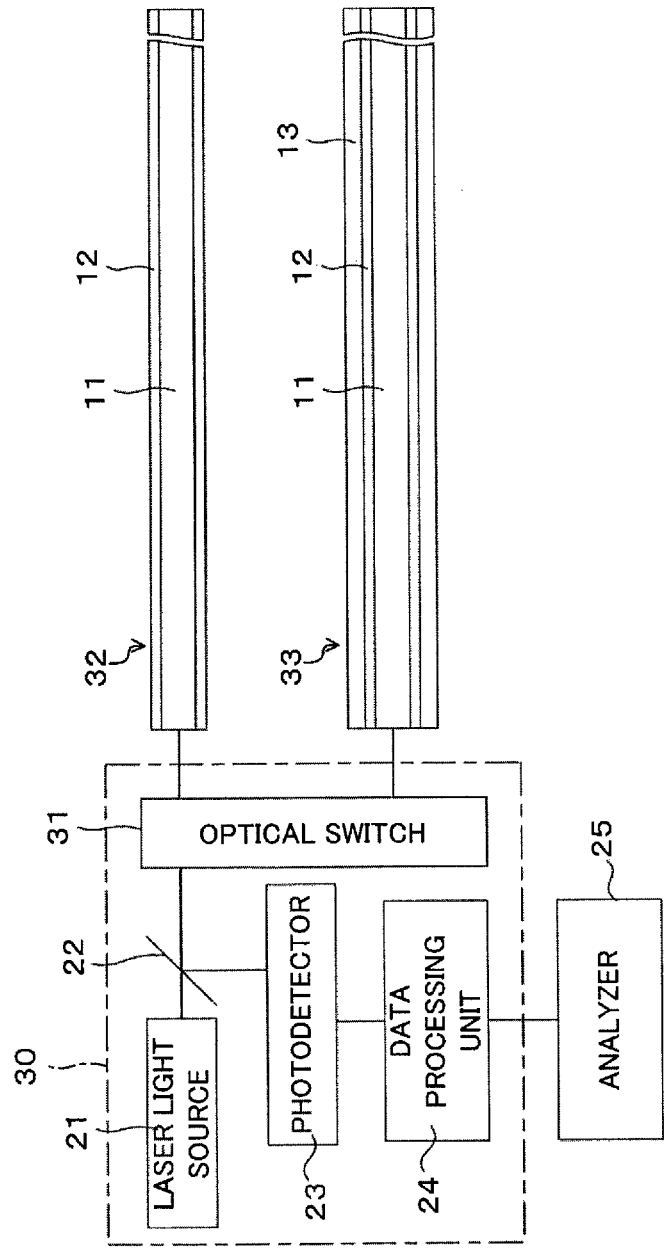
FIG. 11 is a block diagram illustrating an outline of an environmental measurement system according to a second embodiment.

FIG. 11 is a block diagram illustrating an outline of an environmental measurement system according to a second embodiment. Note that the constituents in FIG. 11 which are the same as those in FIG. 1 will be denoted by the same reference numerals and detailed description thereof will be omitted.

This embodiment employs a temperature measurement device 30 connectable to two optical fibers 32 and 33. The temperature measurement device 30 used in this embodiment includes an optical switch 31 and this optical switch 31 controls optical connection among the laser light source 21, the beam splitter 22, and the optical fibers 32 and 33. For example, the above-mentioned Raman scattered light measurement device (DTS800M: manufactured by SENSA) optically switches the connection among the plurality of optical fibers, the laser light source, and the beam splitter by means of an optical switch provided therein. Here, it may be also possible to use a temperature measurement device provided with a plurality of sets of the laser light source 21, the beam splitter 22, and the photodetector 23 instead of the temperature measurement device 30 configured to switch the optical connection by means of the optical switch 31.

One of the optical fibers (hereinafter referred to as a "first optical fiber") 32 connected to the temperature measurement device 30 is formed by providing only the first covering layer 12 around the core wire 11. The above-mentioned multimode graded-index quartz optical fiber (HFR-2Z-1: manufactured by Furukawa Electric Co., Ltd.) is used as the first optical fiber 32, for example.

The other optical fiber (hereinafter referred to as a "second optical fiber") 33 connected to the temperature measurement device 30 is formed by providing two layers, namely, the first covering layer 12 and the second covering layer 13, around the core wire 11. The optical fiber which is the same as the first optical fiber 32 and covered with urethane foam resin (the second covering layer 13) in the thickness of 0.2 mm may be used as the second optical fiber 33, for example. Note that the second optical fiber 33 may include just one covering layer. In this case, it is preferable to use a covering layer having heat capacity and heat conductivity, any one of which is different from that of the covering layer 12 of the first optical fiber 32.

The first optical fiber 32 and the second optical fiber 33 are installed parallel and closely to each other in a measurement position in a facility. A clearance between the first optical fiber 32 and the second optical fiber 33 is set to about 5 mm, for example. Then, a laser beam from the temperature measurement device 30 is inputted to each of the first optical fiber 32 and the second optical fiber 33 and the temperature in the measurement position is measured by means of the backscattered light. In this case, since the second optical fiber 33 is provided with the second covering layer 13, the variation over time of the temperature measured with the second optical fiber 33 has a small fluctuation range and a time delay in comparison with the variation over time of the temperature measured with the first optical fiber 32. As a consequence, according to this embodiment, it may be possible to carry out the processing illustrated in the flowchart in FIG. 9 and to measure the environmental temperature and the wind velocity in the measurement position similarly to the first embodiment.

Although this embodiment uses two optical fibers, this embodiment may enable measurement of the temperatures and the wind velocities (the fluid velocities) in a plurality of measurement positions as similar to the first embodiment. Accordingly, this embodiment involves a simpler system configuration as compared to a system constructed by individually installing a temperature sensor and a wind velocity sensor in each of measurement positions, thereby reducing costs for constructing the system and costs for maintenance. Moreover, similarly to the first embodiment, this embodiment neither uses a heating element for measuring the wind velocities nor uses electric power to be supplied to the heating element. Accordingly, the system consumes less electric power.

(Other Embodiments)

FIGS. 12A, 12B, 13A and 13B are views depicting optical fibers in environmental measurement systems according to other embodiments. In FIGS. 12A, 12B, 13A and 13B, the same constituents as those in FIGS. 2A and 2B will be denoted by the same reference numerals and detailed description thereof will be omitted.

In the first and second embodiments described above, each of the optical fibers serving as the sensor has a smooth peripheral surface. Instead, it may be possible to form grooves on a peripheral surface of an optical fiber as depicted in FIG. 12A and 12B.

Figure 12A:
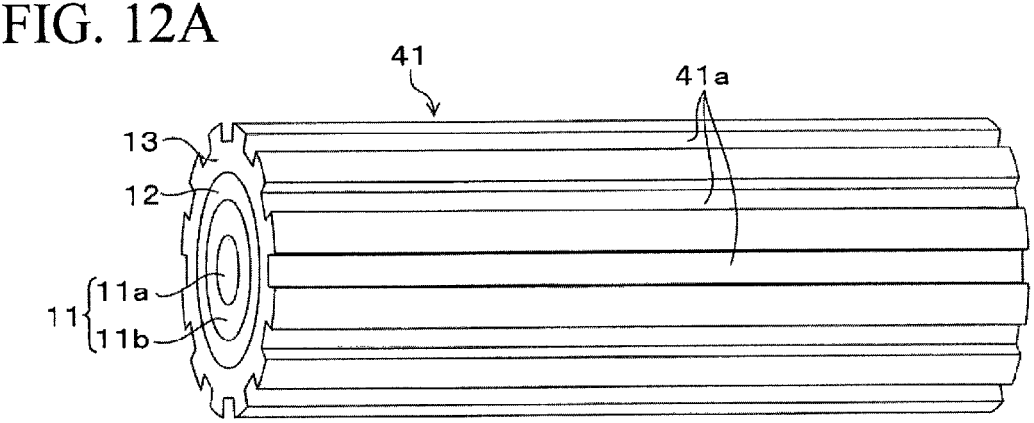
FIGS. 12A and 12B are first views depicting optical fibers in an environmental measurement system according to another embodiment.

In an optical fiber 41 depicted in FIG. 12A, a plurality of grooves 41a extending in a longitudinal direction are provided on a peripheral surface of the outermost covering layer 13. The grooves 41a thus provided on the peripheral surface of the covering layer 13 increase a surface area of the covering layer 13, thereby allowing rapid heat exchange between the wind and the covering layer 13.

Figure 12B:
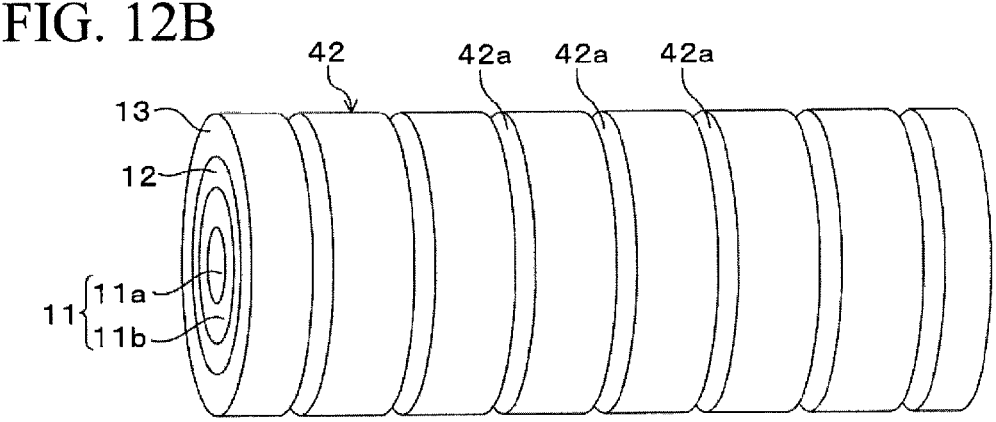

In an optical fiber 42 depicted in FIG. 12B, a plurality of grooves 42a extending in a circumferential direction are provided on the peripheral surface of the outermost covering layer 13. These optical fibers serving as the sensors are installed perpendicularly to the direction of the flow of the wind. In the case of the optical fiber 41 depicted in FIG. 12A, the wind flows in the direction perpendicular to the grooves. Accordingly, it is likely that the flow of the wind causes turbulence. On the other hand, in the case of the optical fiber 42 depicted in FIG. 12B, the wind blows in the direction parallel to the grooves 42a and the turbulence of the flow of the wind becomes less than the case of the optical fiber 41 depicted in FIG. 12A. Thus, it may be possible to adjust characteristics of an optical fiber as a sensor by forming appropriate grooves on a peripheral surface thereof as depicted in FIG. 12A or 12B.

Figure 13A:
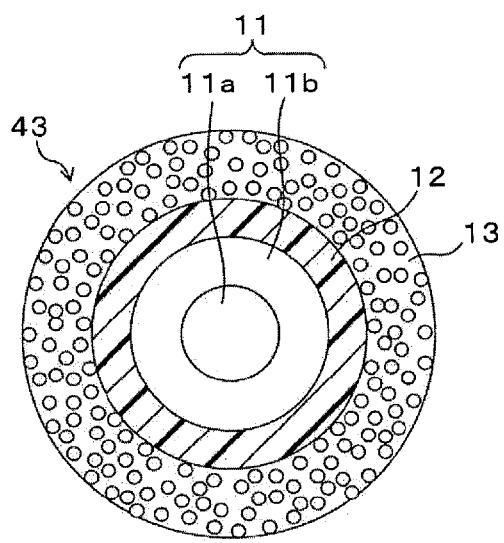
FIGS. 13A and 13B are second views depicting optical fibers in an environmental measurement system according to still another embodiment.
Figure 13B:
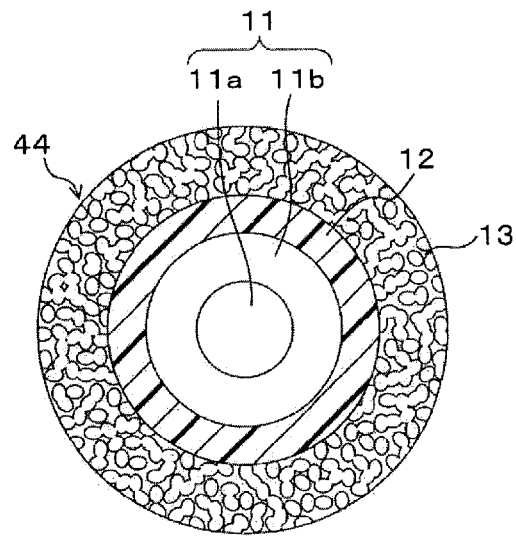

In the meantime, the covering layer 13 may contain air bubbles as depicted in FIGS. 13A and 13B in order to control heat characteristics (the heat capacity and the heat conductivity) thereof. An optical fiber 43 depicted in FIG. 13A contains numerous independent air bubbles inside the covering layer 13. Meanwhile, an optical fiber 44 depicted in FIG. 13B contains numerous continuous air bubbles inside the covering layer 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An environmental measurement system comprising:
an optical fiber including a first measurement portion and a second measurement portion provided with covering layers different at least in any one of heat capacity and heat conductivity;
a temperature measurement device configured to input light into the optical fiber, and to receive backscattered light outputted from the optical fiber to measure temperature distribution in a longitudinal direction of the optical fiber; and an analyzer configured to analyze a variation over time of the temperature distribution outputted from the temperature measurement device to calculate a temperature and a wind velocity in a measurement position where the first measurement portion and the second measurement portion are located, wherein the analyzer calculates a ratio between a fluctuation range of a temperature at the first measurement portion and a fluctuation range of a temperature at the second measurement portion.

2. The environmental measurement system according to claim 1, wherein the optical fiber comprises a plurality of the first measurement portions and a plurality of the second measurement portions arranged along the longitudinal direction of the optical fiber.

3. The environmental measurement system according to claim 1, wherein the analyzer corrects a phase difference between a variation over time of a temperature at the first measurement portion and a variation over time of a temperature at the second measurement portion.

4. The environmental measurement system according to claim 1, wherein the analyzer stores a relation of the wind velocity with a ratio between the fluctuation range of the temperature at the first measurement portion and the fluctuation range of the temperature at the second measurement portion.

5. The environmental measurement system according to claim 1, wherein
the first measurement portion includes:
the covering layer composed only of a first covering layer, and
the second measurement portion includes:
the first covering layer; and
a second covering layer arranged around the first covering layer.

6. The environmental measurement system according to claim 5, wherein
the first covering layer is made of a polymer material, and
the second covering layer is made of any of a polymer material, a metallic material, an inorganic material, and a composite material of any of the polymer material, the metallic material and the inorganic material.

7. The environmental measurement system according to claim 5, wherein a groove is formed in a peripheral surface of the second covering layer.

8. The environmental measurement system according to claim 5, wherein an air bubble is formed inside the second covering layer.

9. An environmental measurement system comprising:
a first optical fiber and a second optical fiber which are different at least in any one of heat capacity and heat conductivity;
a temperature measurement device configured to input light into the first optical fiber and the second optical fiber, and to receive backscattered light outputted from the first optical fiber and the second optical fiber to measure temperature distribution in a longitudinal direction of the first optical fiber and the second optical fiber; and
an analyzer configured to analyze a variation over time of the temperature distribution outputted from the temperature measurement device to calculate a temperature and a wind velocity in a measurement position where the first optical fiber and the second optical fiber are located, wherein the analyzer calculates a ratio between a fluctuation range of a temperature at a portion of the first optical fiber located in the measurement position and a fluctuation range of a temperature at a portion of the second o t cal fiber located in the measurement position.

10. The environmental measurement system according to claim 9, wherein the analyzer corrects a phase difference between a variation over time of a temperature at a portion of the first optical fiber located in the measurement position and a variation over time of a temperature at a portion of the second optical fiber located in the measurement position.

11. The environmental measurement system according to claim 10, wherein the analyzer stores a relation of the wind velocity with a ratio between a fluctuation range of a temperature of the first optical fiber and a fluctuation range of a temperature of the second optical fiber.

12. An environmental measurement method comprising:
locating a first measurement portion and a second measurement portion of an optical fiber in a single measurement position;
inputting light into the optical fiber and measuring a variation over time of a temperature at the first measurement portion and a variation over time of a temperature at the second measurement portion based on backscattered light outputted from the optical fiber;
calculating a temperature in the measurement position based on at least any one of the variation over time of the temperature at the first measurement portion and the variation over time of the temperature at the second measurement portion; and
calculating a wind velocity in the measurement position based on a ratio between a fluctuation range of the temperature at the first measurement portion and a fluctuation range of the temperature at the second measurement portion, wherein
the first measurement portion and the second measurement portion of the optical fiber respectively include covering layers which are different at least in any one of heat capacity and heat conductivity.

13. The environmental measurement method according to claim 12, further comprising, between the measuring a variation over time of a temperature at the first measurement portion and a variation over time of a temperature at the second measurement portion and the calculating a wind velocity:
correcting a phase difference between the variation over time of the temperature at the first measurement portion and the variation over time of the temperature at the second measurement portion.

\* \* \* \* \*

UNITED STATES PATENT AND TRADEMARK OFFICE
CERTIFICATE OF CORRECTION

PATENT NO. : 8,740,454 B2  
APPLICATION NO. : 13/564131  
DATED : June 3, 2014  
INVENTOR(S) : Fumio Takei et al.

Page 1 of 1

It is certified that error appears in the above-identified patent and that said Letters Patent is hereby corrected as shown below:

On the Title Page

Please correct the following to item (73) Assignee:

Fujitsu Limited, Kawasaki (JP)

Signed and Sealed this  
Twenty-fourth Day of February, 2015

Michelle K. Lee  
*Deputy Director of the United States Patent and Trademark Office*